N. R. KRAUSE.
SPEED GOVERNOR FOR SELF FEEDERS.
APPLICATION FILED JUNE 21, 1920.
1,425,782.
Patented Aug. 15, 1922.
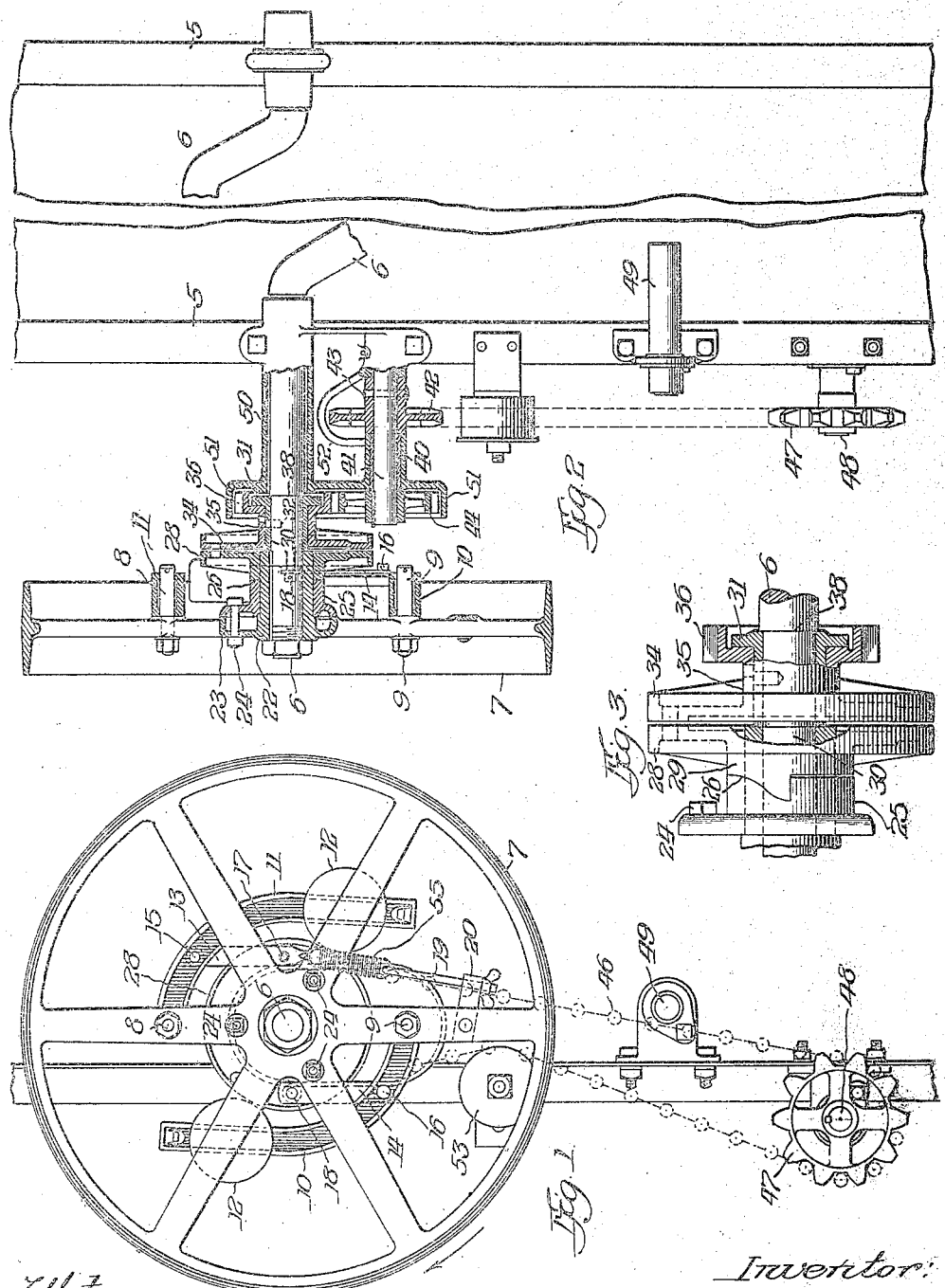

UNITED STATES PATENT OFFICE.

NORMAN R. KRAUSE, OF RACINE, WISCONSIN, ASSIGNOR TO J. I. CASE THRESHING MACHINE COMPANY, OF RACINE, WISCONSIN, A CORPORATION.

SPEED GOVERNOR FOR SELF-FEEDERS.

1,425,782.  Specification of Letters Patent.  Patented Aug. 15, 1922.

Application filed June 21, 1920. Serial No. 390,524.

*To all whom it may concern:*

Be it known that I, NORMAN R. KRAUSE, a citizen of the United States, residing at Racine, in the county of Racine and State of Wisconsin, have invented certain new and useful Improvements in Speed Governors for Self-Feeders, of which the following is a specification.

My invention relates to improvements in speed governors especially adapted for use in connection with threshing machine feeders, and is so constructed and arranged that when conditions require during the feeding of material to the feeder, the crank-shaft carrying the cutter-bars, which latter cooperate with feeding mechanisms driven by said shaft, will be rotated independently of the straw conveyer usually present in such feeders; in other words, when such latter device is caused to cease operation, usually through overfeeding of material or lack of speed, my improved governor will continue operating the cutter-bars and feeding mechanisms coacting therewith so long as any degree of speed is supplied from the source of power, and when the requisite speed is attained which is necessary to operate both the cutter-bars, feeding mechanisms, conveyer and any other mechanisms which cooperate to perform the work of feeding material, said governor will become automatically adjusted to influence the driving and driven elements of such mechanisms and impart a synchronous motion to all the interconnecting elements assembled for the purposes stated.

In the accompanying drawing, forming a part hereof, Figure 1 is a side elevation of my improved governor and parts associated therewith; Fig. 2, a longitudinal sectional view of the same showing the feeder body in fragment, and Fig. 3 is a detail view of parts of said governor.

In said drawings the portions marked, 5, indicate the walls of the feeder through which a crank-shaft, 6, extends, and upon which cutter-bars (not shown) of any suitable construction are mounted. Upon the end of said crank-shaft 6 I mount a wheel or pulley, 7, provided with studs, 8, 9, upon which arms, 10, 11, are pivotally secured, said arms being provided with weights, as 12. To said arms 10 and 11 I attach links, 13, 14, at 15, 16, and which are connected at 17, 18, to a disk, 28, link 13 being connected by a tension rod, 19, to a retainer, 20, on the pulley. Said system of swinging weighted arms, as will be understood, is for controlling the action of disk 28 against cam, 25, the centrifugal motion of said weights as they move outwardly actuating said disk 28 to climb upon cam 25 and thereby contact with disk, 34, to be driven.

Said pulley 7 is provided with a hub, 22, having a flange, 23, in which hub shaft 6 is secured, and to said flange 23 I secure, as by bolts, 24, a cam, 25, having a cam face, 26, at its end with which a disk, 28, having a cam-faced hub, 29, engages. Upon said shaft 6 I mount a hollow stud, 30, having a flange, 31, which stud is preferably secured to said shaft by a pin, 32, and upon said stud I mount a disk, 34, adapted to be contacted by said disk 28, the disk 34 having a hub extension, 35, terminating in a gear, 36, or other driving element. Shaft 6, it will be observed in Fig. 2, is increased in diameter or offset at the point marked, 38, thus forming a shoulder or thrust against which flange 31 of stud 30 abuts, and, therefore, is prevented from inward movement along shaft 6. When said disks and associated parts are assembled it will be seen that they become interlocked upon shaft 6 between said shoulder 38 and pulley 7 and in constant alignment, and by such arrangement I am enabled to readily and positively assemble said parts.

Beneath shaft 6 in a suitable bearing, 40, I mount a stud-shaft, 41, upon which a sprocket, 42, is secured by a pin, 43, and at the outer end of said stud-shaft a gear, 44, is provided which is aligned with gear 36, and is driven thereby through the driving of said disk 28 as will be understood, thus imparting motion to said sprocket 42 which in turn is connected by chain, 46, to a sprocket, 47, on feeding-pan shaft, 48, and actuates the same, a conveyer-shaft, 49, being driven by mechanisms at the opposite side of the feeder communicating with shaft 6. This arrangement of gearing is for actuating mechanism of a feeder of preferred form, but it will be understood that instead of gear 36 carried by the disk 34, I may employ a pulley or sprocket and connect the same to an element to be driven and entirely omit the intermediate countershaft 41 and mechanisms associated therewith.

I prefer to house said gears 36, 44, and sprocket 42, and therefore, provide the housing, 50, which is an extension for the bearing of shaft 6, having a flange, 51, covering gears 36, 44, and having a lower member, 40, terminating in curved raised formation, 52, extending over sprocket 42 for protecting the same, chain 46 being held by a guide, 53, of any suitable character.

In operation, the wheel 7 is preferably driven from the threshing machine cylinder, and, as said wheel rotates, carries with it shaft 6. The weight arms 10, 11, also rotate with said wheel, carrying with them disk 28. When sufficient speed has been attained the centrifugal force of the arms overcomes the tension of spring 55, thereby causing the weights to move outwardly toward the rim of wheel 7, and as these weight arms move outwardly they impart a slight rotary movement to disk 28 through links 13, 14. This rotary movement of disk 28 causes the hub 29 to climb upon cam 26, which disk in turn moves longitudinally upon shaft 6 until it contacts with disk 34, causing the latter to clutch and rotate simultaneously with said disk 28. As the gear 36 is a part of disk 34 the result is that it drives gear 44 with which it meshes, which action of gear 44, as will be understood, in turn drives sprocket 42 to actuate chain 46 and the mechanisms connected therewith. Upon the decrease of speed of wheel 7, spring 55 overcomes the centrifugal force of weights 12, withdrawing the same inwardly through links 13, 14, and as said links are connected to disk 28 they act to untwist cam 29, and thus release the driving contact between disks 28, 34, and permits said disk 34 with the connections associated therewith to cease operation until such time as sufficient speed is attained to throw the weights out again, and which action, of course, causes the disks to become contacted, disk 28 and shaft 6, it being understood, rotating regardless of the speed of said wheel 7. While I have stated that the action of the weighted arms influences the disk 28, this is only to the extent of bringing it in contact with disk 34, and as disk 34 is the driven element, it in turn holds back or tends to retard disk 28, and this action consequently causes a wedging of the cam, or in other words, a climbing of cam 29 upon cam 26, and as said cams increase their camming action the driving pressure upon disk 34 by disk 28 is multiplied accordingly. With such action it will be readily seen that the rotation of the driven elements is governed by the speed of wheel 7, and that the arrangement is extremely sensitive to automatic instant adjustment as the speed varies.

I claim as my invention:

1. The combination, with a self-feeder, of a crank-shaft, a pulley thereon embodying a hub, a cam-faced collar secured to said hub, a disk having a cam-faced extension engaging the cam on said collar, a flanged hollow stud on said crank-shaft, a disk mounted on said stud and adapted to contact with said first mentioned disk and having a driving element at its opposite end, and arms on said pulley connected to said first mentioned disk actuated by centrifugal force to move said cam-disk into contact with said last mentioned disk.

2. The combination, in a speed governor, of a crank-shaft having an offset portion, a flanged hollow stud abutting against said offset shaft portion, a disk embodying a driving element mounted upon said stud, a pulley hub on said crank-shaft, a collar on said hub having a cam face at its end, a disk having a cam-faced extension engaging the cam on said collar, and centrifugally acting means for actuating one of said disks to contact with or separate from the other.

3. The combination, in a speed governor, of a shaft, a wheel thereon, a cam secured to said wheel, a cam disk engaging said cam, a driven disk, and arms on said wheel connected to said cam disk actuated by centrifugal force to move said cam disk into contact with said driven disk.

4. The combination, in a speed governor, of a shaft, a wheel thereon carrying a cam, a disk having a cam adapted to engage said wheel cam, spring-controlled means connected to said wheel and said disk for actuating the latter by centrifugal force, and means adapted to be contacted by said disk through the action of said spring-controlled means and driven thereby.

5. In a speed governor, a combined driven disk and driving element, a driving disk having a cam thereon, a wheel embodying a cam, the latter engaging with said disk cam, and centrifugally acting means associated with said wheel and connected with said driving disk for inducing the latter to climb upon said wheel cam and contact with said driven disk through said camming operation.

6. In a speed governor, a shaft, a wheel thereon having a cam, a disk on said shaft having a cam engaging with said wheel cam, swinging arms on said wheel, links connecting said arms and disk for actuating the latter by the centrifugal force of said arms when said wheel is rotating, and means adapted to be contacted by said disk and driven thereby through the camming action of said cams induced by said swinging arms.

7. In a speed governor, a shaft, a stud on said shaft, means for preventing the movement of said stud longitudinally of said shaft, a combined driven disk and driving element on said stud, a wheel having a hub mounted on said stud-shaft, a driving disk embodying a cam mounted on said hub, a cam connected with said wheel mounted on said hub and engaging said disk cam, arms on said wheel, and links connecting said arms and said driving disk whereby the latter is caused to have a camming effect upon said cam and forced into contact with said driven disk through the centrifugal action of said arms.

8. In a speed governor, a shaft, a driving wheel on said shaft and having a cam associated therewith, a driving disk having a cam thereon engaging said wheel cam, a disk on said shaft to be contacted with and driven by said driving disk, and centrifugally acting means communicating with said wheel and said driving disk to produce a camming effect of the latter upon said wheel cam and be projected longitudinally of said shaft to contact with said driven disk.

In testimony whereof I affix my signature in the presence of two witnesses.

NORMAN R. KRAUSE.

Witnesses:
E. M. JOHNSON,
J. A. WALSH.